US005264987A

United States Patent [19]
Doodson et al.

[11] Patent Number: 5,264,987
[45] Date of Patent: Nov. 23, 1993

[54] CASSETTE FOR MAGNETIC TAPE PROVIDED WITH WINDOW

[75] Inventors: Peter J. Doodson; Norbert C. Vollmann, both of Eindhoven, Netherlands

[73] Assignee: U.S. Philips Corporation, New York, N.Y.

[21] Appl. No.: 888,951

[22] Filed: May 26, 1992

Related U.S. Application Data

[63] Continuation-in-part of Ser. No. 840,366, Feb. 24, 1992, abandoned.

[30] Foreign Application Priority Data

Jun. 14, 1991 [EP] European Pat. Off. ........ 91201475.0

[51] Int. Cl.⁵ .......................................... G11B 23/087
[52] U.S. Cl. ................................................. 360/132
[58] Field of Search ......................... 360/132; 242/199

[56] References Cited

U.S. PATENT DOCUMENTS

| | | | |
|---|---|---|---|
| 4,530,475 | 7/1985 | Buerkle et al. | 360/132 |
| 4,717,091 | 1/1988 | Schoettle et al. | 360/132 |
| 4,771,353 | 9/1988 | Yamaguchi et al. | 360/132 |
| 5,114,092 | 5/1992 | Gelardi et al. | 360/132 |
| 5,161,079 | 11/1992 | Ohshima et al. | 360/132 |

Primary Examiner—Robert S. Tupper
Attorney, Agent, or Firm—Norman N. Spain

[57] ABSTRACT

A cassette (1) provided with magnetic tape (3) comprises a housing (9) with two main walls (11, 13) and a several transverse walls (15, 17, 19, 21). One of the main walls (13) is imperforate and is provided with a window (39) which can be opened and a label (37) interposed between the window (39) and the main wall (13). The window (39) is secured to the housing (9) by means of a tab (45) and projections (55, 57) and can be moved away temporarily from the label (9) to note data on the label (37).

17 Claims, 4 Drawing Sheets

CASSETTE FOR MAGNETIC TAPE PROVIDED WITH WINDOW

RELATED APPLICATIONS

The instant application is a continuation-in-part of application Ser. No. 7/840,366 filed Feb. 24, 1992 and now abandoned.

BACKGROUND OF THE INVENTION

The invention relates to a cassette provided with magnetic tape on two coplanar reels, the cassette comprising a housing having two parallel main walls and a plurality of transverse walls, one of said transverse walls forming a front wall having a front opening across which a part of the magnetic tape extends, of which main walls a first main wall has two reel-drive openings and a second main wall is at least substantially imperforate, which window cassette further comprises a window, which is arranged on the housing and is situated at least partly on the second main wall, and a label situated between the window and the housing.

A cassette of the type defined in the opening paragraph is described in the Netherlands Patent Application 8903088 (PHN 13.185; herewith incorporated by reference), not published prior to the date of filing of the present Application. The cassette described therein is intended for use with a digital audio signal, data about the information recorded on the tape being given on the label. The window and the housing of the cassette do not comprise any provisions for the interconnection of the two parts. Therefore, these parts will have to be glued or welded to one another. If this cassette contains prerecorded tape the label need not be removable from the cassette. However, if this cassette contains blank tape the user will wish to note data about the recordings to be made on the label. However, with the prerecorded cassette this is not possible because the label is covered by the window and the window cannot be removed owing to the glued or welded connection.

SUMMARY OF THE INVENTION

It is an object of the invention to provide a cassette of the type defined in the opening paragraph, enabling the label to be provided with data by the user. This object is achieved, according to the invention, by providing a window can be opened. This enables the window, which covers the label, to be removed to give access to the label.

DETAILED DESCRIPTION OF THE INVENTION

Figure 1:
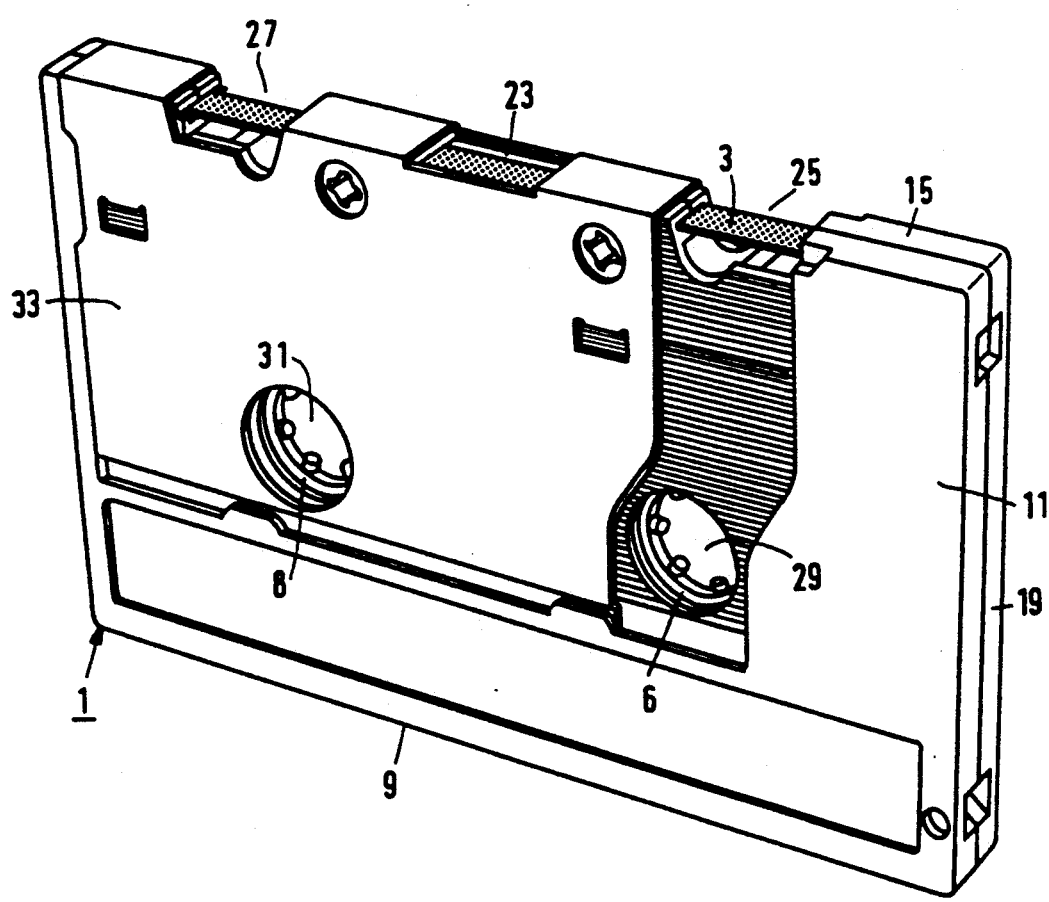
FIG. 1 is a first view of the cassette in accordance with the invention.

An embodiment of the cassette in accordance with the invention is characterised in that the cassette comprises fixing means which detachably secure the window to the housing. This enables the window to be removed from the housing in order to provide access to the label.

An further embodiment of the cassette in accordance with the invention is characterised in that the window and the housing are connected to one another by interlocking. In contrast to a force-assisted connection, i.e. a connection established in that the parts to be connected exert force onto one another, an interlocked connection, i.e. a connection established through the shape of the parts to be connected, does not give rise to stresses in the cassette parts, so that less stringent requirements can be imposed on the parts. Moreover, an interlocked connection precludes fixing problems arising if the stresses decrease as a result of plastic deformations.

A still further embodiment of the cassette in accordance with the invention, in which the window and the housing form cassette sections, is characterised in that the fixing means are integrated with at least one of the cassette sections. The fixing means then no longer constitute separate parts but are integral with the housing and the window. This reduces the cost of manufacturing and assembling the cassette.

Yet another embodiment of the cassette in accordance with the invention, in which the second main wall has a recessed area and one of the transverse walls constitutes a rear wall having a further recessed area, the window being L-shaped and engaging the recessed areas, is characterised in that the fixing means comprise a tab which is integral with the window and the second main wall of the housing has an opening in which the tab engages. Thus, the fixing means are not visible when the window is mounted on the housing, so that the appearance of the cassette is not disturbed.

A favorable embodiment of the cassette in accordance with the invention is characterised in that the opening is situated in the second main wall near the rear wall, an inner surface of the rear wall and a free end of the tab have a recess and a projection engaging the recess.

Yet a further embodiment of the cassette in accordance with the invention is characterised in that the fixing means comprise projections and recesses provided on or in edge surfaces of the window and side walls bounding the recessed areas in the second main wall and in the rear wall, the projections engaging the recesses. These projections and recesses may constitute the fixing means either alone or in combination with the tab and the opening, and are neither visible nor palpable when the window is mounted on housing, so that the appearance of the cassette is not disturbed.

Another embodiment of the cassette in accordance with the invention is characterised in that the window is pivotably connected to the housing. The label is now accessible while the window remains connected to the housing so that it cannot be lost.

Still a further embodiment of the cassette in accordance with the invention is characterised in that in that the label is removable. This enables the label to be reversed so that the rear becomes visible or to be replaced by another label, for example when the data specified on the label no longer corresponds to the information on the magnetic tape.

A further embodiment of the cassette in accordance with the invention is characterised in that the label has a hole at the location of the tab of the window. The tab of the window can be inserted through this hole, so that the label will be positioned correctly between the housing and the window.

Still another embodiment of the cassette in accordance with the invention is characterised in that the label has at least one blank side. If desired, data about the recordings on the magnetic tape can be noted on the blank side by the user.

Yet a further embodiment of the cassette in accordance with the invention, which cassette comprises two reels containing the spools, is characterised in that the housing has at least one transparent window which is fixedly connected to the housing, through which window a part of one of the reels is visible. Thus, the user can see how much magnetic tape is contained on the reel, which may be useful in order to determine the length of tape still available for a further recording.

The invention will now be described in more detail with reference to the drawings.

Figure 2:
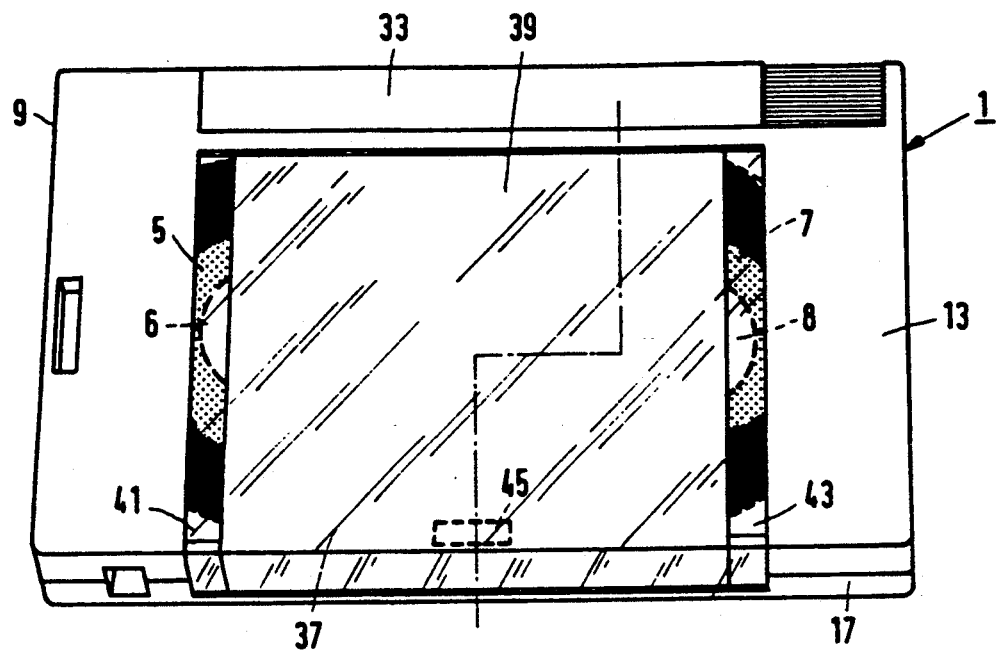
FIG. 2 is a second view of the cassette in accordance with the invention.

FIGS. 1 and 2 show an embodiment of the cassette 1 in accordance with the invention, provided with magnetic tape 3 on two coplanar reels 6 and 8. The cassette 1 has a housing 9 comprising a first and a second main wall 11, 13 and four transverse walls 15, 17, 19, 21 (see also FIG. 5), one of these transverse walls constituting a front wall 15 and another one of these transverse walls constitutes a rear wall 17. The front wall 15 has a front opening 23, for the passage of a magnetic head, and two pressure-roller openings 25 and 27, along which a part of the magnetic tape 3 extends. The housing 9 accommodates two reels 6 and 8 containing the spools 5 and 7. The first main wall 11 has two reel-drive openings 29 and 31 and the second main wall 13 is imperforate. FIG. 1 is a view at the first main wall 11 of the cassette. The cassette 1 has a sliding cover 33 for closing the openings 23, 25, 27, 29 and 31 in the housing 9. The sliding cover 33 is shown in the open position in which the openings are exposed. FIG. 2 is a view at the second main wall 13 of the cassette. The second main wall 13 and the rear wall 17 have a recessed area 35 (see FIG. 6) in which a label 37 and a window 39 are situated. Two transparent windows 41 and 43 adjacent the label 37 show the reels 6 and 8 and the spools 5 and 7.

Figure 3:
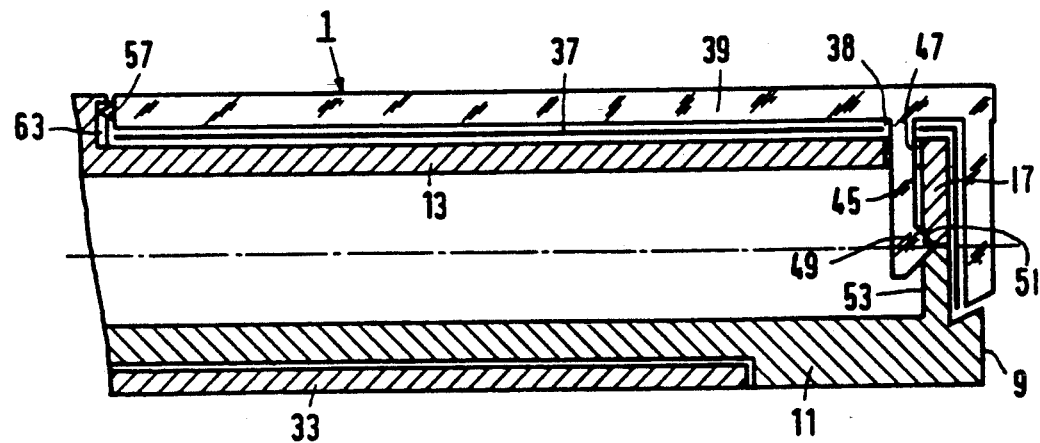
FIG. 3 is a sectional view of the cassette, taken at the location of the fixing means.

The window 39 is detachable from the housing 9 and is secured to the housing by fixing means, see FIG. 3. The fixing means comprise a tab 45 which is integral with the window 39 and which extends through a hole 38 in the label 37 and an opening 47 in the second main wall 13. The tab 45 is connected to the window 39 with one end, the free end having a projection 49 which engages in a recess 51 in the inner surface 53 of the rear wall 17. The rear wall 17 and the window 39 may be formed with further openings at the location of the projection 49, enabling the projection 49 to be pressed out of the recess 51 from the outside so that the window can be removed with less effort. The fixing means further comprise two projections 55 and 57 on an edge surface 59 of the window 39 and two recesses 61 and 63 in a side wall 65 bounding the recessed area 35 in the second main wall 13 (see also FIGS. 4 and 5).

Figure 4:
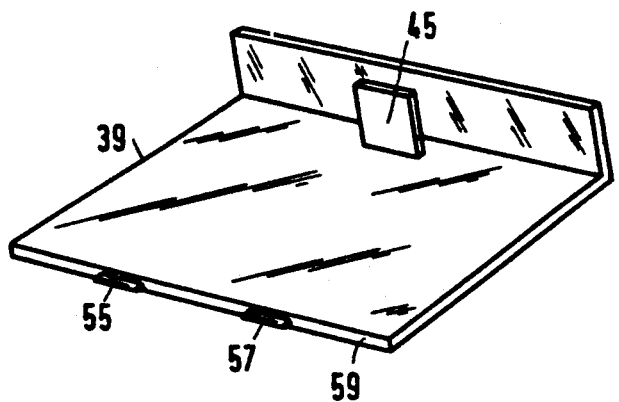
FIG. 4 shows a window of the cassette.

The window 39 is shown separately in FIG. 4. The window 39 is L-shaped and transparent. The window 39 covers the label 37 and the two windows 41 and 43.

Figure 5:
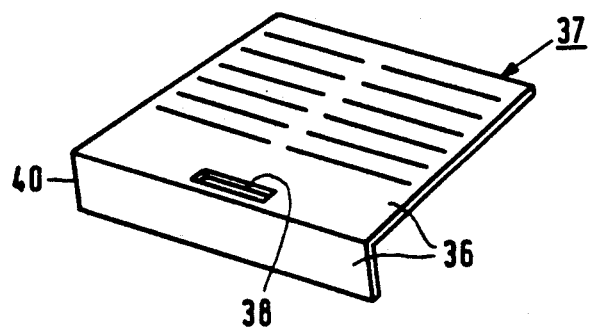
FIG. 5 shows a label of the cassette.
Figure 6:
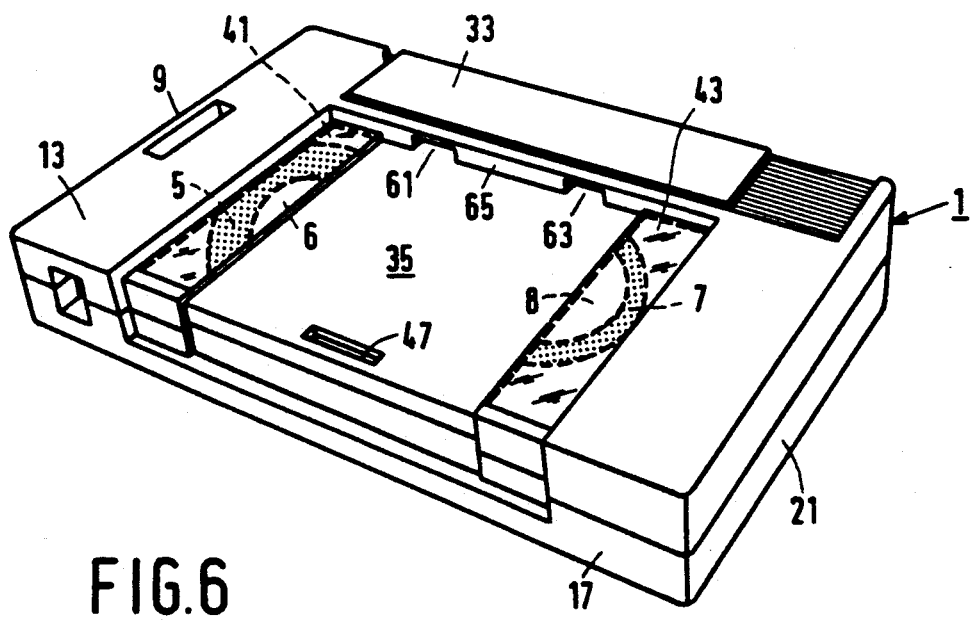
FIG. 6 shows the cassette without label and window.

The label 37 is shown separately in FIG. 5. The label has a hole 38 to accommodate the tab 45 of the window 39. One side 36 of the label is blank and can be used for noting data about the information recorded on the magnetic tape. The other side may be provided with graphics or a logo. By folding the flap 40 of the label 37 to the other side the label can be inserted into the cassette with its other side facing the window, so that at option one side or the other side is visible. FIG. 6 shows the cassette 1 without a window and without a label. The recessed area 35 is deepest at the location of the label. The windows 41 and 43 bound the label area.

Figure 7:
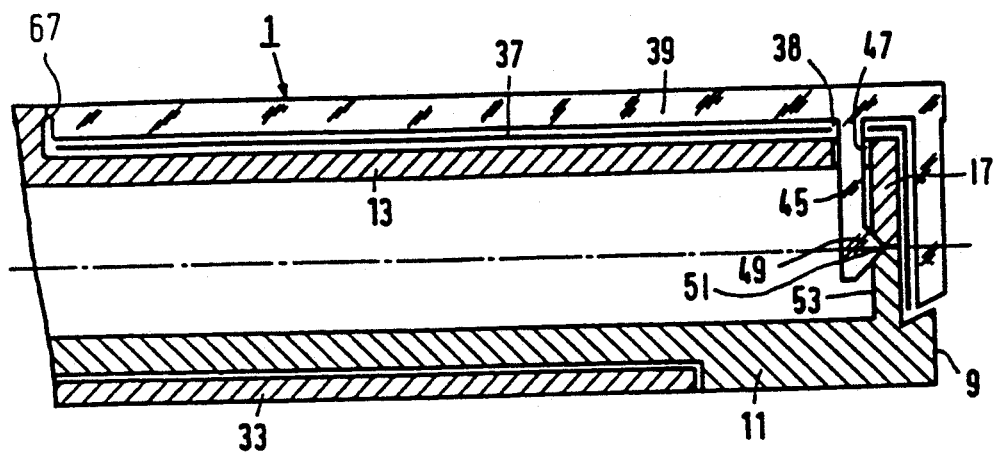
FIG. 7 is a sectional view of a cassette in accordance with the invention, comprising a hinge between the window and the housing.
Figure 8:
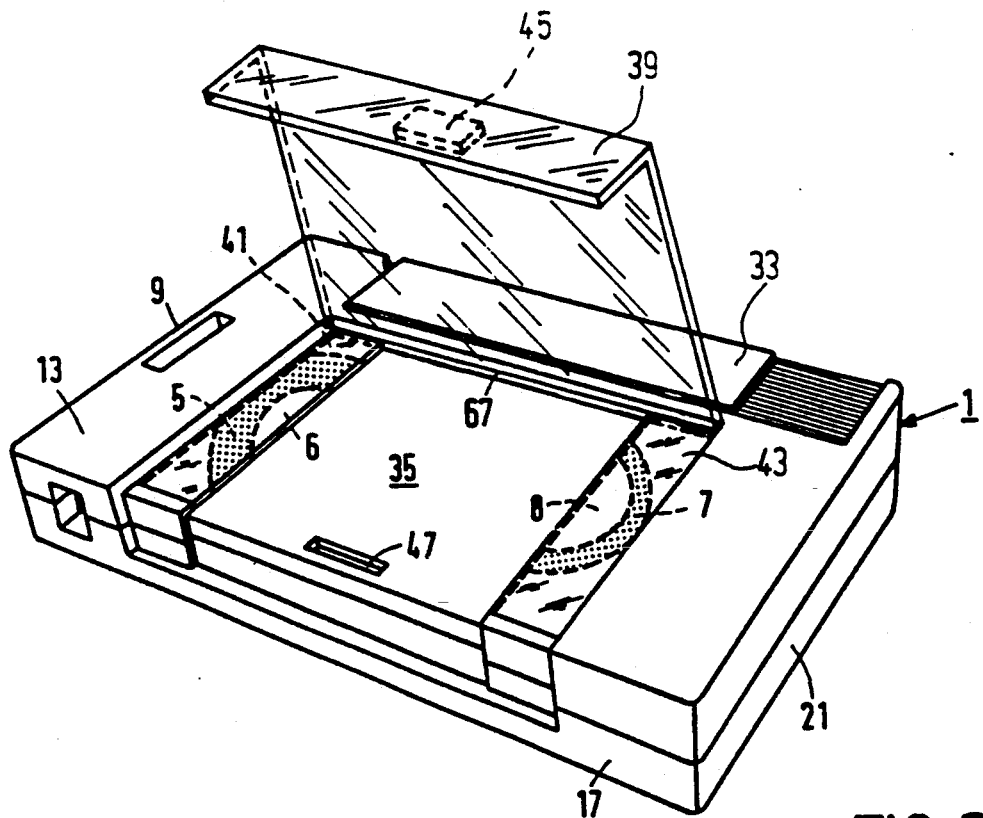
FIG. 8 shows the cassette of FIG. 7 with the window in the open position.

FIG. 7 shows another embodiment of the cassette 1 in which the window 39 is connected to the housing 9 via a flexible hinge 67. Consequently, the window 39 cannot come off the housing 9 and always assumes the correct position when it is closed. FIG. 8 shows the cassette 1 with the window 39 in an open position.

Although in the foregoing the invention has been described with reference to the drawings, it is to be noted that the invention is by no means limited to the embodiments shown in the drawings. The invention also pertains to all embodiments deviating from those in the drawings within the scope defined by the Claims and utilising the basic idea of the invention, which is that a window of a housing of a cassette, which window covers a label, can be opened to give access to a label. For example, in deviation from what is shown in the drawings, it is possible to clamp the window onto the housing of the cassette or to secure the window to the housing by separate fixing means, for example screws. Moreover, it is possible to arrange the tab and the projections on the window at other locations than shown and to form the opening in another part of the housing, for example in the rear wall. Instead of a flexible hinge it is possible to use another hinge and to connect the window to the housing at another location, for example near the rear of the cassette.

What is claimed is:

1. A cassette provided with magnetic tape on two coplanar reels, the cassette comprising a housing having two parallel main walls and a plurality of transverse walls, one of said transverse walls forming a front wall having a front opening across which a part of the magnetic tape extends, of which main walls a first main wall has two reel drive openings and a second main wall is at least substantially imperforate, which cassette further comprises a window, which is arranged on the housing and is situated at least partly on the second main wall, and a label situated between the window and the housing, characterized in that the window is openable and the housing comprises means for opening the window.

2. A cassette as claimed in claim 1, characterized in that the means for opening the window comprises fixing means which detachably secure the window to the housing.

3. A cassette as claimed in claim 2, characterized in that the fixing means interlocks the window and the housing.

4. A cassette as claimed in claim 3, in which the window and the housing form cassette sections, characterised in that the fixing means are integrated with at least one of the cassette sections.

5. A cassette as claimed in claim 4, characterised in that the fixing means comprise projections and recesses provided on or in edge surfaces of the window and side walls bounding the recessed areas in the second main wall and in the rear wall, the projections engaging the recesses.

6. A cassette as claimed in claim 4, in which the second main wall has a recessed area and one of the transverse walls constitutes a rear wall having a further recessed area, the window being L-shaped and engaging the recessed areas, characterised in that the fixing means comprise a tab which is integral with the window and the second main wall of the housing has an opening in which the tab engages.

7. A cassette as claimed in claim 6, characterized in that the label has at least one blank side.

8. A cassette as claimed in claim 6 characterized in that the label is removable.

9. A cassette as claimed in claim 8, characterized in that the label has a hole at the location of the tab of the window.

10. A cassette as claimed in claim 9, characterized in that the label has at least one blank side.

11. A cassette as claimed in claim 6, characterized in that the fixing means comprise projections and recesses provided on or in edge surfaces of the window and side walls bounding the recessed areas in the second main wall and in the rear wall, the projections engaging the recesses.

12. A cassette as claimed in claim 6, characterised in that the opening is situated in the second main wall near the rear wall, an inner surface of the rear wall and a free end of the tab have a recess and a projection engaging the recess.

13. A cassette as claimed in claim 12, characterized in that the fixing means comprise projections and recesses provided on or in edge surfaces of the window and side walls bounding the recessed areas in the second main wall and in the rear wall, the projections engaging the recesses.

14. A cassette as claimed in claim 1, characterized in that the means for opening the window comprises means for pivotably connecting the window to the housing.

15. A cassette as claimed in claim 1, characterised in that the label is removable.

16. A cassette as claimed in claim 9, characterised in that the label has at least one blank side.

17. A cassette as claimed in claim 1, in which cassette the two reels contain spools, characterized in that the housing has at least one additional window which is fixedly connected to the housing and through which window a part of one of the reels is visible.

* * * * *